United States Patent
Gengler et al.

[11] Patent Number: 6,158,523
[45] Date of Patent: Dec. 12, 2000

[54] AGRICULTURAL DISC MOUNTING SYSTEM AND METHOD

[75] Inventors: Allan S. Gengler, Beloit; Bradley A. Heidrick, Simpson; Jeffrey S. Hughes, Glen Elder, all of Kans.

[73] Assignee: Sunflower Manufacturing Co., Inc., Beloit, Kans.

[21] Appl. No.: 09/183,360

[22] Filed: Oct. 30, 1998

[51] Int. Cl.[7] ................................................ A01B 35/28
[52] U.S. Cl. ...................... 172/574; 172/572; 172/573; 172/708; 172/711
[58] Field of Search .................... 172/572, 708, 172/570, 707, 705, 711, 573, 500, 574, 643; 267/158, 164, 47

[56] References Cited

U.S. PATENT DOCUMENTS

| | | |
|---|---|---|
| 889,486 | 6/1908 | Ross . |
| 928,029 | 7/1909 | Craig ........................................ 172/572 |
| 1,529,042 | 3/1925 | Teasley et al. ........................... 172/599 |
| 2,211,675 | 8/1940 | Rushbrook .............................. 172/572 |
| 2,750,861 | 6/1956 | Erwin . |
| 3,058,531 | 10/1962 | Beaman et al. ........................... 172/15 |
| 3,640,348 | 2/1972 | Womble ................................... 172/573 |
| 3,967,685 | 7/1976 | Siekmeier . |
| 4,066,132 | 1/1978 | Rehn ........................................ 172/572 |
| 4,333,535 | 6/1982 | Hentrich, Sr. ........................... 172/572 |
| 4,407,372 | 10/1983 | Rozeboom ............................... 172/572 |
| 4,428,437 | 1/1984 | Steinberg ............................ 172/572 X |
| 4,520,875 | 6/1985 | Deckler ............................... 172/572 X |
| 4,683,958 | 8/1987 | Malinowski et al. ..................... 172/705 |
| 4,724,910 | 2/1988 | Wheeler ................................... 172/464 |
| 4,759,411 | 7/1988 | Williamson ............................. 172/572 |
| 5,042,590 | 8/1991 | Bierl et al. . |
| 5,267,619 | 12/1993 | Eversole . |
| 5,785,129 | 7/1998 | Keller et al. ........................ 172/572 X |

OTHER PUBLICATIONS

Sales Literature of Brillion Iron Works, Inc. of Brillion, Wisconsin for Soil Commander, exact publication date unknown, but at least one year prior to the filing of the present application.

Sales Literature of DMI, Inc. of Goodfield, Illinois for conservation yield–till tools Model 530, exact publication date unknown, but at least one year prior to the filing of the present application.

Sales Literature of Krause Corporation of Hutchinson, Kansas for disc and deep till in one—pass, exact publication date unknown, but at least one year prior to the filing of the present application.

Sales Literature of Landoll Corporation of Marysville, Kansas for Weatherproofer II disc and deep–till, exact publication date unknown, but at least one year prior to the filing of the present application.

Sales Literature of Sunflower Manufacturing Co., Inc. of Beloit, Kansas for Series 4000 Deep Tillage, exact publication date unknown, but at least one year prior to the filing of the present application.

Sales Literature of Sunflower Manufacturing Co., Inc. of Beloit, Kansas for Series 4311 Disc–Ripper, exact publication date unknonw, but at least one year prior to the filing of the present application.

*Primary Examiner*—Victor Batson
*Attorney, Agent, or Firm*—Shughart Thomson & Kilroy P.C.

[57] ABSTRACT

A disc mounting system includes the attachment of each disc to a disc gang bar via a dedicated leaf spring. Each of the leaf springs, which can be generally U shaped, are attached at a top end to the gang bar and at a lower leg to a disc spindle such that the disc is positioned at least partially alongside the spring lower leg. The mounting system allows the disc to deflect vertically, laterally or torsionally when the disc encounters an obstacle. An optional shield can be attached to the leaf spring to prevent soil and debris thrown out by adjacent discs from entering the spring. A disc scraper blade can also be attached to the shield.

37 Claims, 4 Drawing Sheets

AGRICULTURAL DISC MOUNTING SYSTEM AND METHOD

BACKGROUND OF THE INVENTION

1. Field of the Invention

The present invention relates generally to a disc mounting system and method for attaching disc blades to an agricultural implement, such as a disc-ripper, and, more particularly, to such a mounting system and method in which each disc in at least the front disc gangs on the implement is mounted to a gang bar via a respective individual leaf spring. This allows each disc to individually move vertically, laterally and torsionally to relieve stress on the disc blade when an obstacle is encountered.

2. Description of the Related Art

Modern farmers are faced with a variety of problems, including increased concern for soil erosion, crop residue management and rising production costs with stagnant crop prices. One way farmers are successfully addressing each of these concerns is to reduce, as far as possible, the number of passes which a farmer must make over his fields. In corn growing operations, after the corn is harvested, it is important for the farmer to conduct fall tillage to bury the crop residue from the harvested crop and to break up sub-soil compaction in preparation for spring planting. In order to accomplish both of these tasks in a single pass, disc-ripper implements have been developed. Typically a disc ripper has a pair of disc gangs mounted on the front of the implement with the gangs angled inward and rearward toward each other. The front disc gangs are mounted ahead of a number of ripper shanks distributed across the implement. Following the ripper shanks are another pair of disc gangs which are angled inward and forward toward each other.

These disc-rippers, which must be pulled by a large, high horsepower tractor, utilize the front disc gangs to bury the majority of the crop residue. The trailing ripper shanks serve to break up the sub-soil compaction and the trailing rear disc gangs are then used primarily to level any ridges created by the ripper shanks. One of the advantages of a disc-ripper implement is the tendency of the ripper shanks to drive deep into the soil, which makes the entire implement stay in the ground and work the soil consistently. At the same time, the discs are pulled down into the soil by the action of the ripper shanks, which causes them to be consistently buried and working as well. This means that the implement will also tend to stay in the soil and not ride up and over obstacles, such as rocks or extreme hard spots. This means that some relief must be afforded to the disc gangs, particularly on the front of the implement, to prevent the disc mounts from being damaged or the disc blades from being bent or broken as they encounter these obstacles.

In order to address these needs, prior art disc-rippers have attached the discs in a number of different ways. Often the discs are ganged together spindle to spindle and the entire interconnected gang is attached to a gang bar via spring mounts, such as U or C shaped leaf springs or compression coil springs. A problem with this arrangement is the requirement for the entire disc gang to ride up and out of the ground when any of the discs encounters an obstacle, which can result in broken individual discs in the gang and/or large undisced gaps in the field as the entire gang rides up and out of the soil and then settles back down into the soil.

In order to counteract these problems, it is known to provide individual spindle arms for each disc, with each arm having its own compression spring. This arrangement allows each disc in a gang to individually flex backward and upward through an arc dictated by the length of the arm. While this arrangement is an improvement on ganged discs, the discs are required to travel through a relatively long arc in order to clear an obstruction. In addition, if the obstacle encountered is slightly off center of the disc travel, a large amount of side load can be imparted to the disc, often resulting in bending or twisting of the arm, damage to the disc spindle or bearings or even breakage of the disc blade.

At least one prior art attempt has been made to attach individual discs to an implement via respective leaf springs. U.S. Pat. No. 2,750,861 to Robert Erwin, and entitled Mounting for Disc Type Soil Working Tools, is directed to such an arrangement. In the Erwin patent, a substantially U shaped leaf spring is attached, at an upper leg, to a seed hopper and, at a lower leg, to a disc mounting bracket. However, the leaf spring in Erwin extends across the top of the respective disc and extends at a considerable angle with respect to the path of travel of that disc. This arrangement allows the disc to be vertically deflected, but, intentionally, acts to restrain any lateral or twisting motion of the spring and disc. Thus, the Erwin leaf spring mounting system suffers from the same shortcomings as the coil spring mount described above.

It is clear then, that a need still exists for a disc mounting mechanism for ganged disc implements and disc-rippers which allows each individual disc freedom to move away from obstacles and hard spots. Such a disc mounting mechanism should preferably allow each disc to individually move vertically, laterally and torsionally to avoid obstacles without damage to the disc and mounting mechanism. The disc mounting mechanism should also allow debris and trash to freely flow through the discs without impeding the operation of the implement.

SUMMARY OF THE INVENTION

In the practice of the present invention, an agricultural implement, such as a disc-ripper, has front and rear pairs of disc gangs, each of which has a disc gang bar. Each disc in at least the front disc gang pairs is individually attached to the respective disc gang bar via a dedicated leaf spring. Each of the leaf springs, which can be generally U shaped, are attached, via an upper leg, to the gang bar and, via a lower leg, to a disc spindle. The leaf springs can either extend straight down from the gang bar or be laterally offset, but are preferably laterally offset, following the concavity of the disc mounted thereon. This allows for better residue flow through the discs. The leaf springs are also preferably mounted parallel to the cutting edge of the attached disc. This position provides for increased lateral flexibility as well as for the most efficient residue flow around the discs. The bottom end of each leaf spring is bolted or otherwise attached to a weldment which includes a disc spindle. The bolting of each disc spindle to a respective leaf spring allows quick and easy replacement of the spindle in the event of damage. The welded spindle preferably is set at an angle such that the bottom of an attached disc blade runs outward from the top of that blade. This allows soil and residue to flow out the back of the disc instead of being carried up and over the top of the spindle. An optimum angle for these spindles appears to be about 8 degrees from horizontal, but a range of 3 to 15 degrees is possible. An optional shield can be installed on each leaf spring which shield is attached to the top of the spring and covers the side and rear openings of the U shaped spring. The shield prevents soil and residue from being thrown into the spring from the concave side of the neighboring disc. By attaching the shield only at the top of the spring, the spring is free to move but the over-sized shield still acts to prevent residue and soil from entering the spring openings. A scraper can be attached to the shield. Finally, in an alternative embodiment, a disc spindle can be inserted directly through a bore extending through the spring lower leg.

OBJECTS AND ADVANTAGE OF THE PRESENT INVENTION

The objects and advantages of the present invention include: providing an improved agricultural disc mounting system and method; providing such a mounting system and method in which each disc is attached to a disc gang bar via a respective individual leaf spring; providing such a system and method in which each leaf spring is arranged roughly in a U-shape with an upper leg attached to the gang bar and a lower leg attached to a disc spindle; providing such a disc mounting system and method in which individual discs are permitted to flex vertically, laterally and torsionally to relieve stress on the disc blade when an obstacle is encountered; providing such a mounting system and method which allows efficient flow through of soil and residue through the discs; providing such a mounting system and method in which individual springs are provided with shields to prevent soil and residue from being thrown into the spring from adjacent discs; providing such a disc mounting system which is more efficient and better designed for operation in rough terrain and wet soil conditions than prior art mounting systems and methods; and providing such a disc mounting system and method which is efficient and convenient in operation and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to. Said terminology will include the words specifically mentioned derivatives thereof and words of similar import.

II. Prior Art

Figures 2, 6, 9, 10, 11, 12:
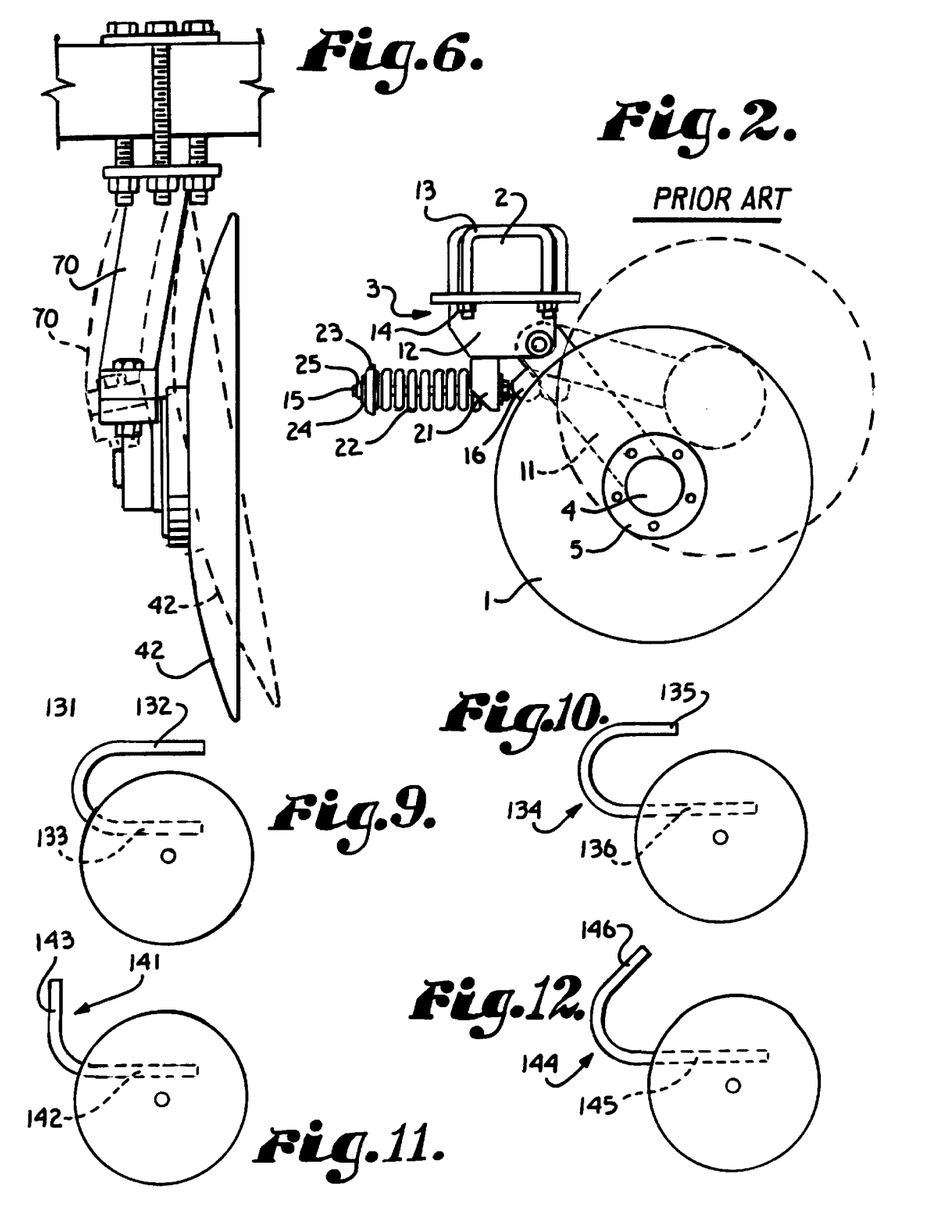
FIG. 2 is a fragmentary, side elevational view of a prior art disc mounting system using individual coil spring loaded arms, and illustrating a down position in solid lines and a deflected position in dotted lines.
FIG. 6 is a greatly enlarged rear elevational view of a disc mounted via the inventive disc mounting system and method, illustrating, in dotted lines, torsional deflection of the disc and spring.
FIGS. 9, 10, 11, and 12 are respective different spring configurations usable with the inventive disc mounting system and method.

Referring to the drawings in more detail, and with particular reference to FIG. 2, a prior art individual disc mounting system is illustrated. In this prior art system, each disc 1 is attached to a disc gang bar 2 via a mounting mechanism, generally indicated at 3. The mounting mechanism 3 includes a spindle 4 to which the disc 1 is attached via a bearing 5. The spindle 4 is rotatably attached to a swing arm 11 which, in turn, is pivotably attached to a mounting bracket 12. The bracket 12 is attached to the gang bar 2 via a pair of U shaped, threaded rods 13 which wrap around the gang bar 2 and which extend through respective bores in the bracket 12 with respective nuts 14 acting to hold them in place. A spring shaft 15 is pivotally attached at one end to a pair of ears 16 extending outward from the swing arm 11, extends through a bore in a plate 21 which extends downward from the bracket 12, and through a coil spring 22, a cup shaped flange 23, a washer 24 and terminates in a threaded nut 25.

In the prior art mounting system 3, the spring 22 acts to pull the swing arm 11, and the attached disc 1, forward to an operating position, as shown in solid lines in FIG. 2. When the disc 1 strikes an obstacle, such as a rock or other obstruction, the disc 1 will be forced backward against the action of the spring 22 to the position indicated in dotted lines in FIG. 2. This action does work somewhat to protect the disc 1 and other components from breakage when the obstacle is encountered in line with the direction of travel of the disc 1. However, when an obstacle is encountered which is positioned even slightly to the side of the disc travel direction, a large amount of side load is imparted to the disc 1, which, even with the relief provided by the spring 22, can bend or twist the swing arm 11, damage the spindle 4 and associated bearings, or even break the disc 1.

III. Inventive Disc Mounting System and Method

Figure 1:
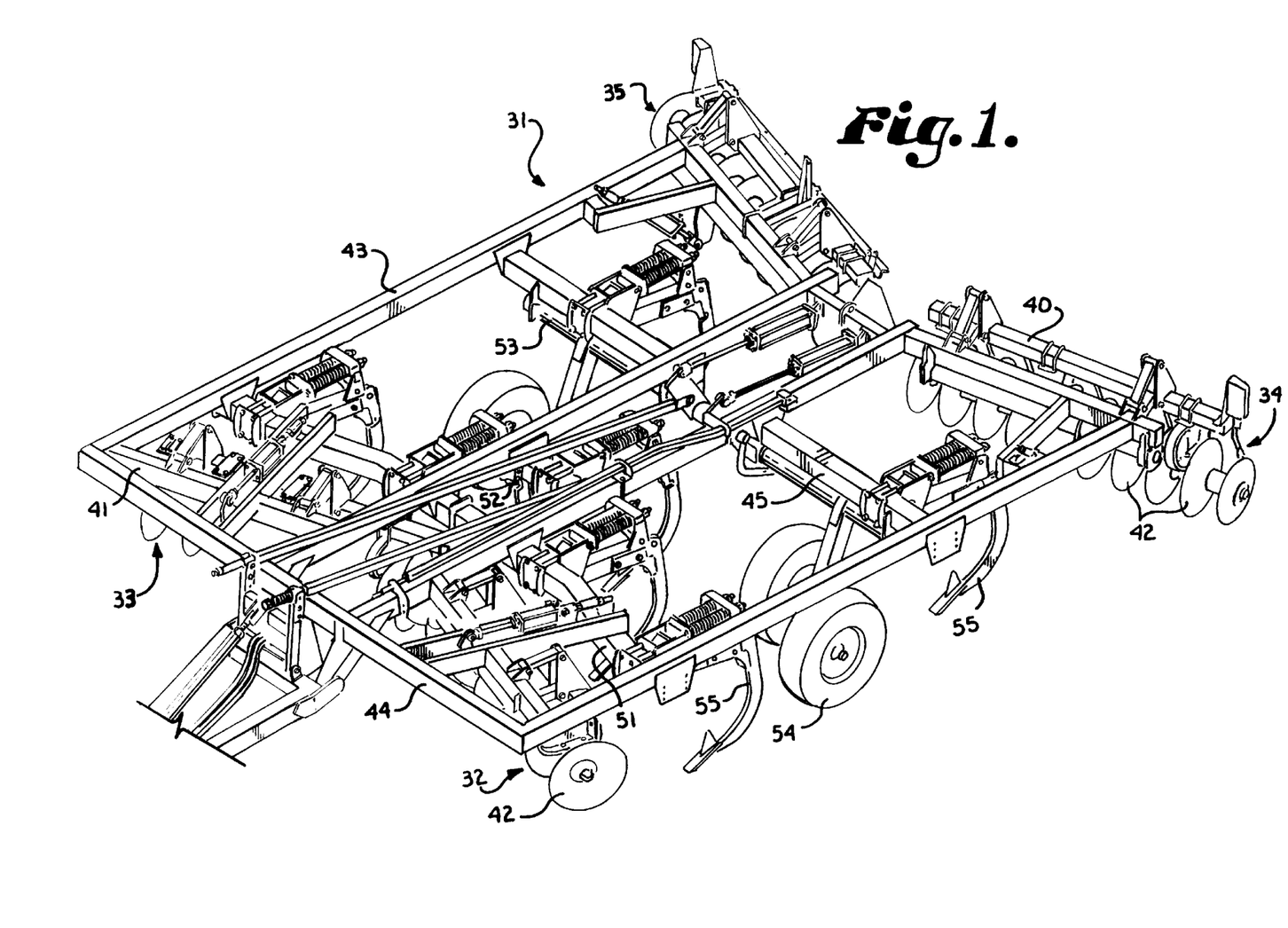
FIG. 1 is a perspective view of a disc-ripper-disc agricultural implement with a pair of front disc gangs, each of which mount a plurality of discs in accordance with the inventive disc mounting system and method.

FIG. 1 illustrates an agricultural disc-ripper-disc implement, generally indicated at 31. The implement 31 includes a pair of front disc gangs 32 and 33 and a pair of rear disc gangs 34 and 35, each of which includes a respective disc gang bar 40 which is supported by a transverse, angled disc gang support arm 41. The front disc gangs 32 and 33 are preferably positioned at respective converging angles which extend inward and rearward from outside to inside, while the rear disc gangs 34 and 35 are preferably positioned at respective converging angles which extend inward and forward from outside to inside. Each disc gang 32–35 supports a plurality of disc blades 42.

The implement 31 includes a frame including four longitudinal frame members 43 interconnected by, in addition to the disc support arms 41, a front transverse frame member 44, a transverse wheel support frame member 45, an angled transverse frame member 51 and a short, intermediate transverse frame member 52. A pair of torque tubes 53 are connected to a respective pair of tandem wheels 54 which support the implement 31 as well as providing depth adjustment, in a known manner.

A plurality of ripper shanks 55 are attached, at various positions along the transverse frame members 45, 51, and 52 via respective spring loaded automatic shank resets 61. The ripper shanks 55 are thus positioned between the front disc gangs 32 and 33 and the rear disc gangs 34 and 35. The disc-ripper-disc arrangement of the implement 31 is designed to utilize the disc blades 42 in the front disc gangs 32 and 33 to bury the majority of crop residue in a field. The trailing ripper shanks 55 serve to break up any sub-soil compaction and the disc blades 42 within the trailing disc gangs 34 and 35 are used primarily to level any ridges created by the ripper shanks 55. As stated earlier, the ripper shanks 55 tend to drive deep into the soil, which pulls the disc blades 42 in the front and rear disc gangs 32–35 down into the soil by the action of the ripper shanks 55, which causes the disc blades 42 to be consistently buried and working as well. This means that the implement 31 will tend to stay in the soil and not ride up and over obstacles, such as rocks or extreme hard spots. With this arrangement, it is important that the disc blades 42, particularly on the front disc gangs 32 and 33 be individually, resiliently mounted to their respective gang bars 40 to prevent the disc blades 42 and mounts from being damaged or broken. However, the prior art individual disc mounting system, as illustrated in FIG. 2, is inadequate for the reasons stated earlier.

The inventive disc mounting system is better illustrated in FIGS. 3–7, and is generally indicated at 61. Only a portion of the left disc gang bar 32 is illustrated, it being understood that the right disc gang bar is a mirror image thereof. In the mounting system 61, each front disc blade 42 is attached to a disc spindle 62, which is attached to a weldment 63 with a generally horizontal plate 64. The plate 64 is bolted to a bottom side of a lower leg 65 of a U shaped leaf spring 70 with a closed end 71 of the "U" facing forward. An upper leg 72 of the spring 70 is attached to the disc gang bar 40 by sandwiching it between a pair of clamping plates 73 and 74. The clamping plates, in turn, are attached to the disc gang bar 40 via a plurality of bolts 75 which extend upward on either side of the bar 32 and through the top clamping plate 73, and which are secured in place by a like plurality of nuts 76. One of the bolts 75 preferably extends through a bore in the spring upper leg 72.

Figures 3, 4, 5:
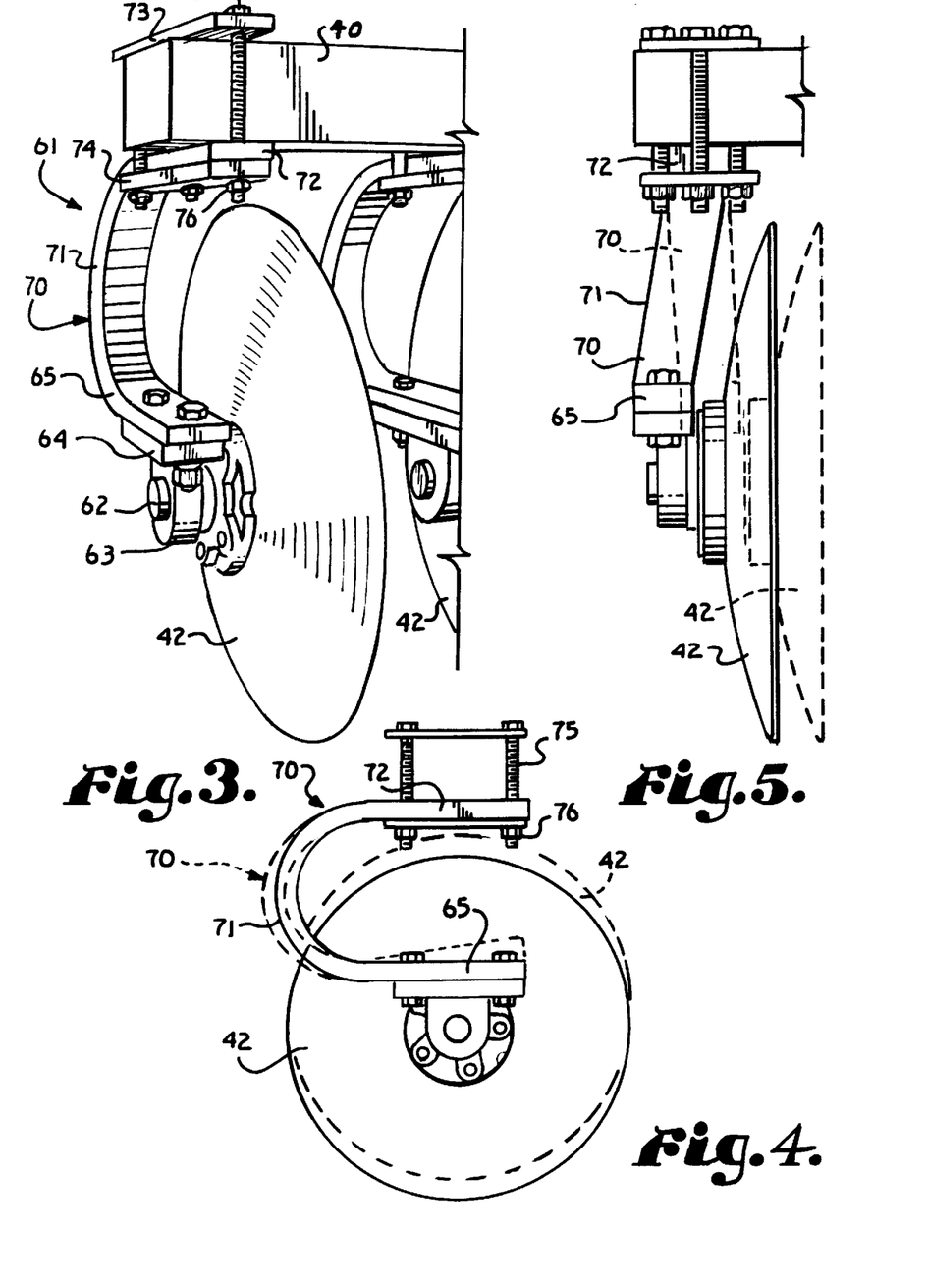
FIG. 3 is a greatly enlarged, fragmentary perspective view of a portion of the implement of FIG. 1, illustrating a pair of discs attached to a gang bar using the inventive attachment system and method, with the mounting system shown without an optional shield for ease of illustration.
FIG. 4 is a greatly enlarged side elevational view of a disc mounted via the inventive disc mounting system and method, illustrating, in dotted lines, vertical deflection of the disc and spring.
FIG. 5 is a greatly enlarged rear elevational view of a disc mounted via the inventive disc mounting system and method, illustrating, in dotted lines, lateral deflection of the disc and spring.

The upper leg 72 of the spring 70 is preferably offset from the lower leg 65, the closed end 71 of the spring 70 extends downward at an angle with respect to vertical, as shown in FIG. 5, which angle approximately follows the concavity of the disc blade 42. This offset angle allows for better residue flow between adjacent disc blades 42. The disc spindles 62 are mounted in a range of ¼ to 1 times the diameter of the disc blade 42 away from the front of the spring closed end 71. The disc spindles 62 are preferably positioned at an angle with respect to horizontal to allow the bottom of each disc blade 42 to run outward with respect to the top of that disc blade 42. This allows soil and residue to flow out the back of the disc blade 42 rather than being carried up and over the spindle 62. By contrast, if the spindle were perfectly horizontal, the concavity of the disc blades 42 would tend to hold the soil and residue in and bring it up and over the top of the hub and spindle, resulting in "plugging" of the discs. An optimum angle for the spindles 62 has been found to be approximately eight degrees, but a range of 5 degrees either side of that can be effective as well.

Figure 7:
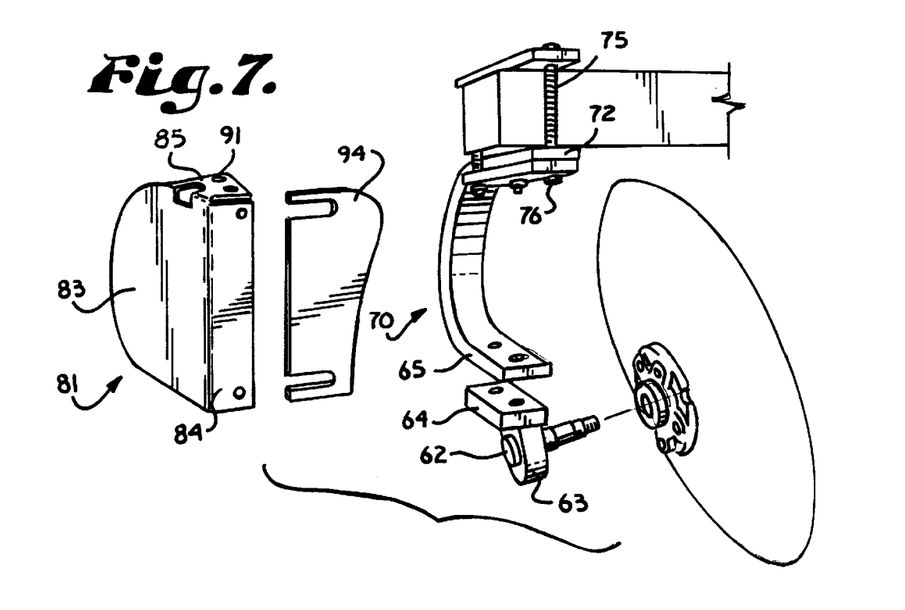
FIG. 7 is an exploded, perspective vis of a disc and inventive disc mounting system, illustrating an optional shield and scraper blade.

Referring to FIG. 7, a shield 81 is formed from a single plate which is bent to include a large side covering portion 83, a rear covering portion 84 and a top, attachment portion 85 with a plurality of attachment bores 91 extending there through. Each shield 81 can be attached to a respective spring 70 by extending the bolts 75 through the attachment bores 91 prior to securing them via the nuts 76. The shield 81 is thus secured to the spring 70 only at the top thereof, which allows the spring 70 to freely flex, but the shield 81 is still maintained in covering relation with a spring side opening 92 and front opening 93. A contoured scraper blade 94 can be attached to the rear covering portion 84 of the shield 81 via threaded bores 95 in the rear covering portion 84. The scraper blade 94 acts to scrape the concave surface of the disc blade 42 as it rotates.

IV. Operation of the Disc Mounting System and Method

Referring to FIGS. 4–6, a number of different disc deflection positions are schematically illustrated. FIG. 4 illustrates a disc blade 42 and spring 70 in solid lines in a working position and, in dotted lines, flexing vertically. Thus, if the disc blade 42 encounters an obstacle directly in it's path, it has the freedom to deflect vertically to prevent damage. FIG. 5 illustrates the disc blade 42 and spring 70 in solid lines in a working position and, in dotted lines, flexing laterally. Thus, if the disc blade 42 encounters a large obstacle which is positioned to one side or the other, or encounters other difficult situations, such as wet soil conditions, it has the freedom to deflect laterally to prevent damage. Finally, FIG. 6 illustrates the disc blade 42 and spring 70 in solid lines in a working position and, in dotted lines, flexing torsionally. Thus, if the disc blade 42 encounters an obstacle which is positioned such that just the lower portion of the disc blade 42 is forced sideways, it has the freedom to deflect torsionally to prevent damage. Of course, FIGS. 4–6 show simplistic deflection positions for ease of illustration, but any combination of vertical, lateral and/or torsional deflection can be accommodated in one motion by the inventive disc mounting system 61.

V. Alternative Embodiments of the Disc Mounting System and Method

Figure 8:
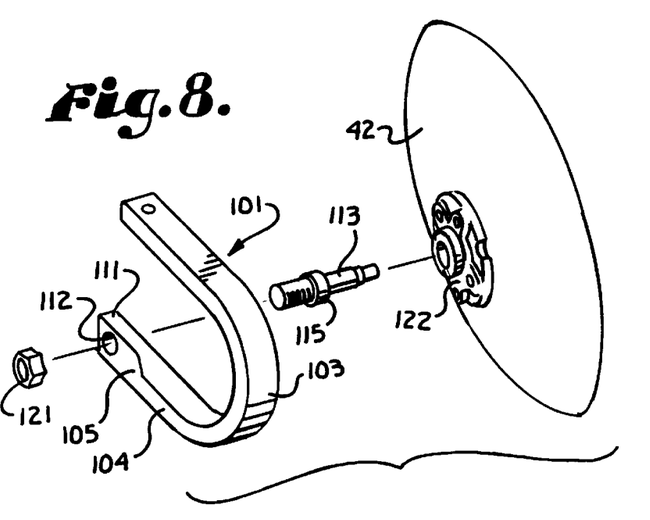
FIG. 8 is a perspective view of a disc attached to an alternative embodiment of leaf spring which integrally incorporates a horizontal bore to directly receive a disc spindle.

FIG. 8 illustrates an alternative embodiment of U shaped spring 101 which includes an upper leg 102 which is essentially identical to the upper leg 72 of the spring 70. The spring 101 also includes a closed end 103 and a lower leg 104 which lower leg 104 includes a taper 105 which results in a substantially vertical spindle receiving portion 111. The spindle receiving portion 111 includes a through bore 112 which is sized to receive a modified disc spindle 113. The disc spindle 113 includes a circular collar 115 which abuts the spring spindle receiving portion 111 on one side thereof and the spindle 113 is threaded so as to receive a securing nut 121 on the opposite side of the spindle receiving portion 111 to secure the spindle 113 in position. The through bore 112 can extend through the spindle receiving portion 111 of the spring 101 at an angle with respect to horizontal, e.g. approximately eight degrees, to give the spindle 113 and attached bearing 122 and disc blade 42 the preferred angle, e.g. eight degrees, as previously mentioned.

FIGS. 9–12 illustrate a variety of alternative configurations of leaf spring which are usable with the present invention. FIG. 9 illustrates a U shaped spring 131 generally consistent with the above description, i.e. with an upper leg 132 which is substantially the same length as a lower leg 133. FIG. 10 illustrates a different U shaped spring 134 with an upper leg 135 which is substantially shorter than a lower leg 136. In FIG. 11, a spring 141 is essentially L shaped, with a lower leg 142 attached to a disc spindle and a front leg 143 extending substantially vertically. Finally, FIG. 12 illustrates a shape somewhat between that of FIG. 10 and FIG. 11, i.e. a spring 144 includes a lower leg 145 with a curved front leg 146 which extends upward and rearward at a substantial angle with respect to vertical. Any of the shapes illustrated in FIGS. 9–12 can be used with the present invention, the common feature being attachment of a lower spring leg proximate a disc spindle such that the disc is positioned alongside at least a portion of the lower spring leg.

Other variations on the inventive disc mounting system and method will occur to those of ordinary skill in the art. For example, the implement 31 has been illustrated and described as a disc-ripper-disc implement, but the disc mounting system is not limited to such an implement. For example, the disc mounting system can also be used effectively with an implement in which chisel shanks or other ground working tools are substituted for the ripper shanks 55. Furthermore, although only the front discs 42 have been described as incorporating the inventive mounting system, if desired, both front and rear discs can be so mounted. Accordingly, it is to be understood that while certain forms of the present invention have been illustrated and described herein, it is not to be limited to the specific forms or arrangement of parts described and shown.

What is claimed and desired to be secured by Letters Patent is as follows:

1. An individual disc mounting system for an agricultural implement having a plurality of individual disc blades, the mounting system comprising:
   a. a leaf spring with an upper leg and a lower leg connected by a closed end, said lower leg having a longitudinal axis and a bottom surface generally parallel to said longitudinal axis;
   b. a mounting apparatus configured to attach said upper leg to the implement, such that said lower leg longitudinal axis is oriented generally horizontally; and
   c. a disc spindle apparatus attached to said leaf spring lower leg such that said disc spindle apparatus extends outward from said lower leg in a direction which is generally transverse to said lower leg bottom surface, said disc spindle apparatus supporting a bearing which accommodates only one of the individual disc blades such that the disc blade is positioned alongside a portion of said leaf spring lower leg and is freely rotatable relative to said spring lower leg, wherein positioning of said leaf spring at least partially alongside the disc blade allows the disc blade to deflect vertically, horizontally and/or torsionally when it encounters an obstacle.

2. A disc mounting system as in claim 1, wherein said disc spindle apparatus is attached to said leaf spring lower leg such that said disc spindle apparatus is canted at an angle in the range of 3 to 13 degrees from horizontal.

3. A disc mounting system as in claim 2, wherein said disc spindle apparatus angle is approximately eight degrees from horizontal.

4. A disc mounting system as in claim 1, wherein said leaf spring lower leg includes a spindle mounting portion with a through bore extending substantially horizontally there through.

5. A disc mounting system as in claim 1, wherein said leaf spring is generally U shaped.

6. An agricultural disc mounting system for attaching individual disc blades to an implement, comprising:
   a. a leaf spring with an upper leg and a lower leg connected by a closed end, wherein said leaf spring closed end is canted at an angle with respect to vertical such that said upper leg is offset with respect to said lower leg;
   b. a mounting apparatus configured to attach said upper leg to the implement; and
   c. a disc spindle apparatus attached to said leaf spring lower leg such that said disc spindle apparatus extends outward from said lower leg, said disc spindle apparatus supporting a bearing which accommodates one of the individual disc blades such that the disc blade is positioned alongside a portion of said leaf spring lower leg and is freely rotatable relative to said spring lower leg, wherein positioning of said leaf spring at least partially alongside the disc blade allows the disc blade to deflect vertically, horizontally and/or torsionally when it encounters an obstacle.

7. A disc mounting system as in claim 6, wherein each said disc is formed with a concave outer surface and the angle of said leaf spring closed end approximates the angle formed by the outer concave surface of an attached disc.

8. A disc mounting system as in claim 6, and further comprising a shield attached to the leaf spring, said shield including a side covering portion which is positioned to cover a portion of a side opening of said leaf spring sufficient to keep soil and residue from entering said side opening.

9. A disc mounting system as in claim 8, wherein said shield further includes a rear covering portion which covers a portion of a rear opening of said spring sufficient to keep soil and residue from entering said rear opening.

10. A disc mounting system as in claim 8, and further comprising a disc scraper blade which is attached to said shield rear covering portion in a position to scrape a concave side of the attached disc blade.

11. An agricultural implement including a plurality of front disc blades positioned proximate a front end of the implement with the front disc blades being spaced laterally across the implement, a plurality of rear disc blades attached to the implement proximate a rear end thereof, with the rear disc blades also being spaced laterally across the implement, and a plurality of ground working tools having ripper shanks attached to the implement with each of the ripper shanks being positioned intermediate the front and rear disc blades, the improvement comprising a disc mounting system for attaching said disc blades to said implement, comprising:
   a. a leaf spring with an upper leg and a lower leg connected by a closed end;
   b. a mounting apparatus configured to attach said upper leg to the implement; and
   c. a disc spindle apparatus attached to said leaf spring lower leg such that said disc spindle apparatus extends outward from said lower leg, said disc spindle apparatus supporting a bearing which accommodates only one of the disc blades such that the disc blade is positioned alongside a portion of said leaf spring lower leg and is freely rotatable relative to said spring lower leg, wherein positioning of said leaf spring at least partially alongside the disc blade allows the disc blade to deflect vertically, horizontally and/or torsionally when it encounters an obstacle.

12. A disc mounting system as in claim 11, wherein said disc spindle apparatus is attached to said leaf spring lower leg such that said disc spindle apparatus is canted at an angle in the range of 3 to 13 degrees from horizontal.

13. An implement as in claim 12, wherein said disc spindle apparatus angle is approximately eight degrees from horizontal.

14. An implement as in claim 11, wherein said leaf spring lower leg includes a spindle mounting portion with a through bore extending substantially horizontally there through.

15. An implement as in claim 11, wherein said leaf spring is generally U shaped.

16. An agricultural implement including a plurality of front disc blades positioned proximate a front end of the implement with the front disc blades being spaced laterally across the implement, a plurality of rear disc blades attached to the implement proximate a rear end thereof, with the rear disc blades also being spaced laterally across the implement, and a plurality of ground working tools having ripper shanks attached to the implement with each of the ripper shanks being positioned intermediate the front and rear disc blades, the improvement comprising a disc mounting system for attaching said disc blades to said implement, comprising:
   a. a leaf spring with an upper leg and a lower leg connected by a closed end, wherein said leaf spring closed end is canted at an angle with respect to vertical such that said upper leg is offset with respect to said lower leg;
   b. a mounting apparatus configured to attach said upper leg to the implement; and
   c. a disc spindle apparatus attached to said leaf spring lower leg such that said disc spindle apparatus extends outward from said lower leg, said disc spindle apparatus supporting a bearing which accommodates one of the disc blades such that the disc blade is positioned alongside a portion of said leaf spring lower leg and is freely rotatable relative to said spring lower leg, wherein positioning of said leaf spring at least partially alongside the disc blade allows the disc blade to deflect vertically, horizontally and/or torsionally when it encounters an obstacle.

17. An implement as in claim 16, wherein each said disc is formed with a concave outer surface and the angle of said leaf spring closed end approximates the angle formed by the outer concave surface of an attached disc.

18. An implement as in claim 16, and further comprising a shield attached to the leaf spring, said shield including a side covering portion which is positioned to cover a portion of a side opening of said leaf spring sufficient to keep soil and residue from entering said side opening.

19. An implement as in claim 18, wherein said shield further includes a rear covering portion which covers a portion of a rear opening of said spring sufficient to keep soil and residue from entering said rear opening.

20. An implement as in claim 18, and further comprising a disc scraper blade which is attached to said shield rear covering portion in a position to scrape a concave side of the attached disc blade.

21. A method of mounting an individual disc blade to an agricultural implement, comprising the steps of:
   a. providing a leaf spring with an upper leg and a lower leg connected by a closed end, said lower leg having a longitudinal axis and a bottom surface generally parallel to said longitudinal axis;
   b. mounting said leaf spring upper leg to the implement, such that said lower leg longitudinal axis is oriented generally horizontally; and
   c. attaching a disc spindle apparatus to said leaf spring lower leg in a position such that said disc spindle apparatus extends outward from said lower leg in a direction which is generally transverse to said lower leg bottom surface, said disc spindle apparatus supporting a bearing which accommodates only one disc blade such that the disc blade is positioned alongside a portion of said leaf spring lower leg and is freely rotatable relative to said leaf spring lower leg.

22. A method as in claims 21, wherein said attaching step includes the step of attaching said disc spindle apparatus to said leaf spring lower leg such that said disc spindle apparatus is canted at an angle in the range of 3 to 13 degrees from horizontal.

23. A method as in claim 22, wherein said disc spindle apparatus angle is approximately eight degrees from horizontal.

24. A method of mounting a disc blade to an agricultural implement, comprising the steps of:
   a. providing a leaf spring with an upper leg and a lower leg connected by a closed end;
   b. mounting said leaf spring upper leg to the implement;
   c. attaching a disc spindle apparatus to said leaf spring lower leg in a position such that said disc spindle apparatus extends outward from said lower leg, said disc spindle apparatus supporting a bearing which accommodates one disc blade such that the disc blade is positioned alongside a portion of said leaf spring lower leg and is freely rotatable relative to said leaf spring lower leg; and
   d. attaching a shield to the leaf spring, said shield including a side covering portion which is positioned to cover a portion of a side opening of said leaf spring sufficient to keep soil and residue from entering said side opening and a rear covering portion which covers a portion of a rear opening of said spring sufficient to keep soil and residue from entering said rear opening.

25. A method as in claim 24, and further comprising the step of attaching a disc scraper blade to said shield rear covering portion in a position to scrape a concave side of the attached disc blade.

26. An agricultural disc mounting system for attaching individual disc blades to an implement, comprising:
   a. a leaf spring with an upper leg and a lower leg connected by a closed end, said leaf spring closed end being canted at an angle with respect to vertical such that said upper leg is offset with respect to said lower leg;
   b. a mounting apparatus configured to attach said upper leg to the implement; and
   c. a disc spindle apparatus attached to said leaf spring lower leg such that said disc spindle apparatus extends outward from said lower leg, said disc spindle apparatus supporting a bearing which accommodates only one of the individual disc blades such that the disc blade is positioned alongside a portion of said leaf spring lower leg and is freely rotatable relative to said spring lower leg, wherein positioning of said leaf spring at least partially alongside the disc blade allows the disc blade to deflect vertically, horizontally and/or torsionally when it encounters an obstacle.

27. A disc mounting system as in claim 26, wherein each said disc is formed with a concave outer surface and the angle of said leaf spring closed end approximates the angle formed by the outer concave surface of an attached disc.

28. An agricultural disc mounting system for attaching individual disc blades to an implement, comprising:
   a. a leaf spring with an upper leg and a lower leg connected by a closed end;
   b. a mounting apparatus configured to attach said upper leg to the implement;
   c. a disc spindle apparatus attached to said leaf spring lower leg such that said disc spindle apparatus extends outward from said lower leg, said disc spindle apparatus supporting a bearing which accommodates only one of the individual disc blades such that the disc blade is positioned alongside a portion of said leaf spring lower leg and is freely rotatable relative to said spring lower leg, wherein positioning of said leaf spring at least partially alongside the disc blade allows the disc blade to deflect vertically, horizontally and/or torsionally when it encounters an obstacle; and
   d. a shield attached to the leaf spring, said shield including a side covering portion which is positioned to cover a portion of a side opening of said leaf spring sufficient to keep soil and residue from entering said side opening.

29. A disc mounting system as in claim 28, wherein said shield further includes a rear covering portion which covers a portion of a rear opening of said spring sufficient to keep soil and residue from entering said rear opening.

30. A disc mounting system as in claim 28, and further comprising a disc scraper blade which is attached to said shield rear covering portion in a position to scrape a concave side of the attached disc blade.

31. An implement as in claim 11, wherein said leaf spring closed end is canted at an angle with respect to vertical such that said upper leg is offset with respect to said lower leg.

32. An implement as in claim 31, wherein each said disc is formed with a concave outer surface and the angle of said leaf spring closed end approximates the angle formed by the outer concave surface of an attached disc.

33. An implement as in claim 11, and further comprising a shield attached to the leaf spring, said shield including a side covering portion which is positioned to cover a portion of a side opening of said leaf spring sufficient to keep soil and residue from entering said side opening.

34. An implement as in claim 33, wherein said shield further includes a rear covering portion which covers a portion of a rear opening of said spring sufficient to keep soil and residue from entering said rear opening.

35. An implement as in claim 33, and further comprising a disc scraper blade which is attached to said shield rear covering portion in a position to scrape a concave side of the attached disc blade.

36. A method of mounting a disc blade to an agricultural implement, comprising the steps of:
   a. providing a leaf spring with an upper leg and a lower leg connected by a closed end;
   b. mounting said leaf spring upper leg to the implement;
   c. attaching a disc spindle apparatus to said leaf spring lower leg in a position such that said disc spindle apparatus extends outward from said lower leg, said disc spindle apparatus supporting a bearing which accommodates only one disc blade such that the disc blade is positioned alongside a portion of said leaf spring lower leg and is freely rotatable relative to said leaf spring lower leg; and
   d. attaching a shield to the leaf spring, said shield including a side covering portion which is positioned to cover a portion of a side opening of said leaf spring sufficient to keep soil and residue from entering said side opening and a rear covering portion which covers a portion of a rear opening of said spring sufficient to keep soil and residue from entering said rear opening.

37. A method as in claim 36, and further comprising the step of attaching a disc scraper blade to said shield rear covering portion in a position to scrape a concave side of the attached disc blade.

* * * * *